(12) United States Patent
Diebold

(10) Patent No.: US 6,701,242 B1
(45) Date of Patent: Mar. 2, 2004

(54) DEVICE AND METHOD FOR ACTUATING A BRAKE SYSTEM OF A MOTOR VEHICLE ACCORDING TO DRIVING SITUATION

(75) Inventor: Jürgen Diebold, Eschborn (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 10/009,020

(22) PCT Filed: Jun. 2, 2000

(86) PCT No.: PCT/EP00/05034

§ 371 (c)(1),
(2), (4) Date: Dec. 6, 2001

(87) PCT Pub. No.: WO00/76818

PCT Pub. Date: Dec. 21, 2000

(30) Foreign Application Priority Data

Jun. 10, 1999  (DE) .......................................... 199 26 397

(51) Int. Cl.$^7$ .............................. B60T 7/04; B60T 13/74
(52) U.S. Cl. .............................. 701/70; 701/78; 701/83; 303/13; 188/156
(58) Field of Search .............................. 701/70, 76, 82, 701/78, 83; 303/13, 16, 14, 121; 318/370, 371, 440, 446; 188/156, 106 F

(56) References Cited

U.S. PATENT DOCUMENTS

| | | | | |
|---|---|---|---|---|
| 4,618,040 A | * | 10/1986 | Honma et al. .................. | 477/71 |
| 4,629,043 A | * | 12/1986 | Matsuo et al. ............... | 477/184 |
| 5,180,038 A | * | 1/1993 | Arnold et al. ............... | 188/171 |
| 5,255,962 A | * | 10/1993 | Neuhaus et al. ............. | 303/188 |
| 5,417,624 A | * | 5/1995 | Weissbrich et al. ........... | 477/71 |
| 5,667,282 A | * | 9/1997 | Kim .............................. | 303/3 |
| 6,019,436 A | * | 2/2000 | Siepker ........................ | 303/13 |
| 6,139,117 A | * | 10/2000 | Shirai et al. .................... | 303/3 |
| 6,270,172 B1 | * | 8/2001 | Shirai et al. ................. | 303/152 |

FOREIGN PATENT DOCUMENTS

| | | |
|---|---|---|
| DE | 39 09 907 | 9/1990 |
| DE | 195 10 796 | 10/1996 |
| DE | 198 29 126 | 5/1999 |
| DE | 198 32 167 | 5/1999 |
| DE | 197 51 659 | 6/1999 |
| DE | 198 53 036 | 6/1999 |
| DE | 198-36-687 | 8/1999 |
| DE | 198 31 541 | 3/2000 |
| DE | 199 01 581 | 5/2000 |
| EP | 0 825 081 | 2/1998 |

OTHER PUBLICATIONS

Search Report of German Patent Office for Appln 19931345.8.

\* cited by examiner

*Primary Examiner*—Tan Q. Nguyen
(74) *Attorney, Agent, or Firm*—Rader, Fishman & Grauer PLLC

(57) ABSTRACT

To implement a brake system having an electric parking brake function as well as comfort-oriented, brake-specific driver assistance functions (starting-traction control, hill holder, parking assistance, etc.), it is especially required to further process input data relating to the driving condition of the motor vehicle and being used to detect the driver's request within an integrated control device in such a way that an operation of the brake system which is reliable and takes the driving situation into consideration is ensured. To this end, the electronic control device that serves to generate control signals for a subsequent actuator device which is connected to the wheel brakes is designed in a modular manner. The control device contains individual software modules which evaluate and further process the input data recorded by the control device. Particular importance is attached to a coordination module which coordinates the requirement signals $F_{EPB}$, $\dot{F}_{EPB}$, $F_{APB}$, $\dot{F}_{APB}$ supplied by the individual modules and generates output signals $F_{res}$ and $\dot{F}_{res}$ which result from this coordination in order to control the actuator device connected to the wheel brakes.

6 Claims, 1 Drawing Sheet

DEVICE AND METHOD FOR ACTUATING A BRAKE SYSTEM OF A MOTOR VEHICLE ACCORDING TO DRIVING SITUATION

TECHNICAL FIELD

The present invention generally relates to brake systems and more particularly relates to a brake system for motor vehicles with an integrated electromechanic parking brake function.

BACKGROUND OF THE INVENTION

German patent specification DE 39 09 907 C2 discloses a brake system for motor vehicles with a parking brake. The parking brake comprises a parking or brake lever, which is operable by the driver and permits acting upon a brake cable to release and apply the wheel brakes irrespective of a drive unit. Further, the parking brake includes a control device which is designed as a control electronics and, on the inlet side, is connected to at least one rotational speed sensor for sensing the wheel speed, to at least one direction-of-rotation sensor for detecting the direction of rotation of a wheel, and to a switch lever position sensor for detecting the switch lever position characteristic of a selected gear of a shift transmission. In dependence on the sensor data evaluated by the control electronics, the prior art parking brake may also be operated, i.e., tensioned or released, automatically, without any action by the driver, as soon as the vehicle is in a parking or driving situation which necessitates tensioning or releasing of the parking brake.

It is disadvantageous in this prior art arrangement of a parking brake that only an inappropriate driving-situation-responsive execution of the request of a driver is provided because a possible automatic brake intervention is intended only during standstill of the vehicle or at very low speeds. In addition, the parking brake reacts to manual actuation by the driver only in a mode of operation where the parameters of the driving condition do not have any basic influence on the actual execution of the brake operation.

It is likewise known from EP 0 825 081 A1 to realize an automatic starting-traction control function by means of a parking brake system operated by independent force. In general, it is necessary to evaluate and further process several input data characterizing the driving condition of the vehicle, within a control unit in the sense of release criteria for the automatic starting-traction control function. In parallel, corresponding input signals are sent to the control unit which characterize the driver's request with respect to the parking brake actuation. This necessitates an extremely complex total structure of the control unit and the processing of large data volumes.

Based on the above, an object of the present invention is to provide a brake system with an integrated electromechanic parking brake function and an automatic brake-specific driving assistance function, wherein the different brake requirements are coordinated and realized in dependence on the driving situation.

The brake system of the present invention comprises an electromechanic parking brake device (EPB=electric parking brake) which has an operating element for detecting the driver's request for brake actuation. Further, the brake system includes an electronic driver assistance device for the automatic execution of at least one brake-specific driver assistance function (e.g. starting-traction control, hill holder, traffic lights stop, parking assistance, etc.) which is able to automatically act upon the brake system in the sense of an active parking brake APB.

The brake functions are executed accordingly within the brake system by means of an electronically operable actuator device for the actuation of at least one wheel brake. An electronic control device for the conversion of input signals into corresponding output signals for the actuation of the actuator device finally ensures the controlled application or release of the wheel brakes. The input signals include the operating condition of the motor vehicle or the condition of operating devices of the motor vehicle. Both the current vehicle dynamics data and the operating data defined by the condition of the operating device (accelerator pedal, brake pedal, parking brake lever or pedal, clutch pedal, gear selector lever or pedal, etc.) are sent to the control device and processed by it.

The actual control device has a modular design, and independent software modules are produced which can be developed separately of one another as the purpose may be. A first software module (EPB module) serves for the conversion of input signals into corresponding signals for the execution of a parking brake function induced by the driver. Another module, i.e., a second module (APB module) generates from the input signals signals for the execution of the automatic driver assistance function which is implemented within the driver assistance device with its specific marginal conditions inside the brake system. The modular design of the software packages within the control device permits an improved and, in particular, quicker data flow which enhances the performance of the control device in total. Further, the modular software design permits a configuration of the individual modules related to their purpose and application and integration of them into the control unit in a simple fashion. Moreover, additional driver assistance functions can easily be inserted into the total system by a supplementary software component. It is this way possible that brake systems which are already provided with an electric parking brake device are supplemented with additional driver assistance functions to achieve an active parking brake APB.

Designing the control device with a first module for basically processing input data which gather the driver's request for brake actuation, and a second module which processes data for the execution of automatic and brake-specific driver assistance functions provides a coordination module according to a favorable embodiment in which the signals supplied by the two modules are processed to resulting signals. The said signals are appropriate for the actuation of an actuator device which is connected to the wheel brakes. The objective of the coordination module is to generate output signals from the signals arriving from the two software modules connected upstream.

The present invention also includes a method for controlling a method brake system. In general, output signals which result from the incoming input signals are produced within the control device, the said output signals representing to the subsequent actuator device instantaneous nominal values for the actuating force end value $F_{res}$ and the value of the force variation $\dot{F}_{res}$ (time derivative of the instantaneous force actual value) to be used therefor. The actuator device can be controlled by way of these output signals $F_{res}$, $\dot{F}_{res}$ in an application oriented manner and in response to the driving situation. As input signals for the control device, corresponding data relating to the driving condition of the motor vehicle (engine torque, vehicle speed, condition of the ignition system, etc.) are gathered, on the one hand, and condition data of the operating devices actuatable by the driver are acquired, on the other hand, by way of which data the driver can take influence on the operating condition of the motor vehicle (accelerator pedal, brake pedal, clutch pedal, parking brake switch/lever/pedal, ignition system, engaged gear, etc.). The input signals gathered by the control device are sent to the two software modules (EPB/APB modules) and processed by them. The first EPB module includes an operating concept for the driving-situation responsive actuation of the parking brake and, apart from data about the operating condition of the vehicle, considers in first place the driver's request for brake actuation. From this, signals $F_{EPB}$ and $\dot{F}_{EPB}$ are generated in the EPB module which principally correspond to the instructions for the actuator device.

In parallel, the input data received from the control device are sent to the APB module which, in the sense of an active parking brake, can put into practice additional automatic driver assistance systems such as starting-traction control, hill holder, maneuvering aid/parking assistance system, etc. Requirement signals $F_{APB}$ and $\dot{F}_{APB}$ which analogously correspond to the first module are generated by the APB module. The data supplied by the EPB and APB module are sent to a coordination module which compares and evaluates the corresponding data. Resulting output signals $F_{res}$ and $\dot{F}_{res}$ which are used for the actuation of the subsequent actuator device are generated by the coordination module in dependence on the requirement values $F_{EPB}$, $\dot{F}_{EPB}$, $F_{APB}$, $\dot{F}_{APB}$. The coordination unit as such must ensure that the driver's request for brake actuation has priority in being considered, on the one hand, and that the specification is satisfied, on the other hand, to reach the resulting force end value with a dynamics that depends on the driving condition.

DETAILED DESCRIPTION OF THE PREFERRED EMBODIMENTS

Figure 1:
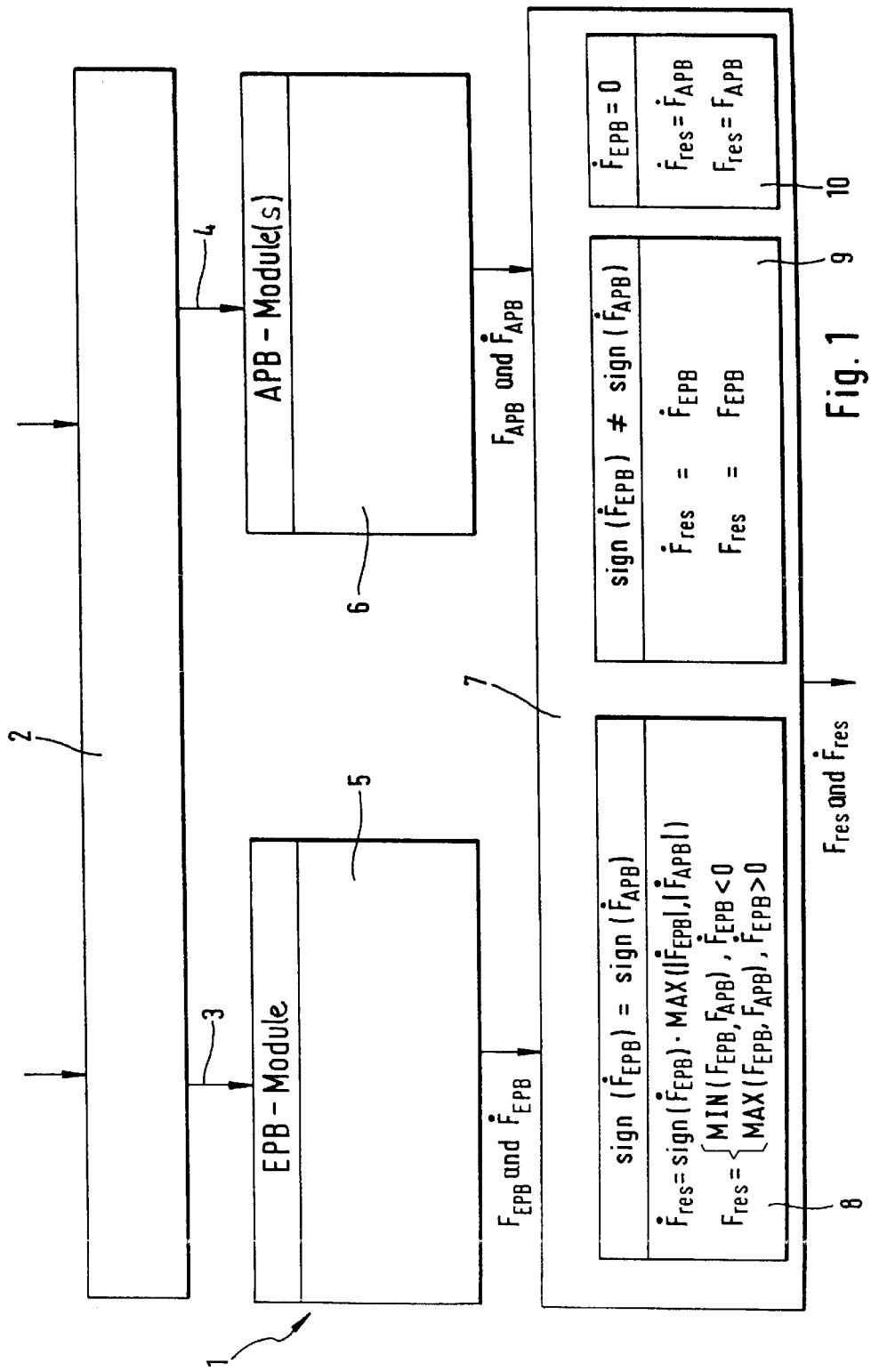
FIG. 1 is a schematic diagram for the course of the control process within the control device.

FIG. 1 illustrates in a schematic view the design of an electronic control device 1 within a generic brake system. In general, the brake system includes an electromechanic parking brake device which is in a position to gather the driver's request for brake actuation by means of an operating element and to send the corresponding actuating data to the control device 1. Further, the brake system comprises an electronic driver assistance device for the automatic execution of at least one brake-specific driver assistance function in dependence on the motion condition of the motor vehicle (e.g. starting-traction control, hill holder, parking assistance, etc.).

In this respect, the electronic control device 1 is provided to generate corresponding output signals based on input data about the driving condition of the motor vehicle and data from operating devices (accelerator pedal, brake pedal, clutch pedal, parking brake switch/lever/pedal, engaged gear, etc.) to be actuated by the driver, which output data is used to actuate a subsequent actuator device. The actuator device (not shown) is a component part of the brake system and, preferably, is designed so as to be electromechanically operable. Actuator devices of this type may have different configurations. Favorable embodiments of such actuator devices are e.g. central actuators which may act centrally on several wheel brakes, or decentralized actuators which respectively act upon one single wheel brake. It is preferred to integrate decentralized actuators into the wheel brake.

The electronic control device 1 comprises a signal conditioning unit 2 which acquires the input data about the driving condition of the motor vehicle and about the operating devices representative of the driver's request and processes them for further data processing operations within the control device. Thus, the current driving condition and the influence on the driving condition desired by the driver is detected within the signal conditioning unit 2, and data representative of these conditions is sent to the subsequent software modules by way of signal paths 3, 4.

An EDB module 5 is provided which, in the form of a software package, which operates similarly to that invoked by a driver in response to a driving situation. In this concept, the EPB module 5 evaluates the signal supplied by an associated operating element responsive to the driving situation and outputs an actuation/release requirement ($F_{EPB}$, $\dot{F}_{EPB}$) corresponding to conventional operating requirements of a mechanic parking brake. The EPB module serves for the consideration and execution of the electromechanic parking brake operation induced by the driver by way of the operating element.

An APB module 6 is integrated as a second or further software package into the control device 1. In the sense of an active parking brake, the APB module allows extending the functionality of the entire brake system with an electromechanic parking brake device. It permits the additional implementation of driver assistance systems such as starting-traction control, hill holder, maneuvering aid, parking assistance system, etc. Such functionalities enhance the comfort and the user friendliness of the entire brake system. Similar to the first module, corresponding requirement signals $F_{APB}$ and $\dot{F}_{APB}$ are generated within the APB module 6 which correspond to the requirement data for the actuation of a subsequent actuator device. In detail, the APB module 6 evaluates in conformity with its functionality (e.g. starting-traction control) vehicle signals such as accelerator, brake, clutch pedal applications, engine torques, engaged gear, vehicle speed, etc., and also supplies an actuation/release requirement ($F_{APB}$, $\dot{F}_{APB}$) which corresponds to the functionality of the driver assistance system. Thus, any desired driver assistance functions can be integrated in the control device 1 by an appropriate configuration of the individual software units, and several APB modules 6 can be used in this arrangement.

For the coordination of the requirement signals $F_{EPB}$, $\dot{F}_{EPB}$, $F_{APB}$, $\dot{F}_{APB}$ which represent nominal values for the actuating force and the actuating force variation of the actuator device and are supplied by the separate modules 5, 6, this data is further processed in a coordination module 7. In general, the coordination of the signals furnished by the individual modules 5, 6 is especially important when requirement signals for the actuation of an actuator device are sent by both modules in a driving situation.

A distinction must be made between several cases of operation for the coordination of the two requirements of the EPB module 5 or the APB module 6. In a first case, i.e., with identical signs of the two requirement signals for the variation of the actuating force $\dot{F}_{EPB}$ and $\dot{F}_{APB}$, the EPB module 5 and the APB module 6 provide actuation or release requirements which aim in the same direction, i.e., both demand simultaneously an actuation of the brake, or both demand simultaneously a release of the brake. Therefore, the coordination module 7 must give higher priority to that software module which demands the higher dynamics or predefines the higher extent of force variation to achieve the common objective of both modules 5, 6 (i.e., tensioning or releasing). With different requirements $F_{EPB}$ and $F_{APB}$ for the end value of the actuating force, the objective is to consider the requirement which is the more extensive one in each case. That means, the minimum during 'release' and the maximum of both preset values during 'clamping'. Thus, the following algorithm for the determination of the resulting output signals $F_{res}$ and $\dot{F}_{res}$ for the case sign ($\dot{F}_{EPB}$)=sign ($\dot{F}_{APB}$) results by way of a first calculating instruction 8 within the coordination module 7:

$$\dot{F}_{res} \text{sign}(\dot{F}) \cdot \text{Max}(|\dot{F}_{EPB}|, |\dot{F}_{APB}|)$$

$$F_{res} = \begin{cases} \text{Min}(F_{EPB}, F_{APB}), & \dot{F}_{EPB} < 0; \text{ (release)} \\ \text{Max}(F_{EPB}, F_{APB}), & \dot{F}_{EPB} > 0; \text{ (tensioning)} \end{cases}$$

A safe operation of the brake system in response to the driving situation is ensured in conformity with this first calculating instruction 8. For example, when the driver triggers an electromechanic parking brake operation during driving by means of a corresponding operating element (actuation in the tensioning direction), this is done with a slow dynamics (compared to a stationary vehicle). When a driver now actuates the service brake system in parallel, a hill holder is able to apply the electromechanic parking brake with full dynamics when the standstill of the vehicle is detected, because the standstill of the vehicle is reliably detected when the service brake system is actuated. The slower requirement from the EPB module 6 is ignored in conformity with the above calculating instruction (maximum formation).

When, as another example, the electromechanic parking brake is slowly released by the APB module 6 when the vehicle is starting to drive, the driver can accelerate the release operation by actuating the operating element of the parking brake device in the direction of release. Higher priority is granted to the direct operation by the driver in this case.

In the second case, with simultaneous activity of the two modules 5, 6, the variations of the actuating force $\dot{F}_{EPB}$ and $\dot{F}_{APB}$ have different signs. In this situation, the EPB and APB modules 5, 6 supply actuation and release requirements which aim at different directions, that means, while one of the modules requires 'tensioning', the other module requires 'releasing' the parking brake in parallel thereto. The coordination module 7 must give higher priority to the signal of the EPB module 5 also in this case because it has a direct connection to an operation by the driver. Thus, the driver may eventually influence the driving condition of the motor vehicle on his/her own by a corresponding access to the operating element of the parking brake device.

For example, when the electromechanic parking brake is slowly released by the APB module 6 during a starting maneuver, the driver is able to discontinue the release operation of the electromechanic parking brake and the starting maneuver of the vehicle by actuating the operating element for the parking brake device in the direction 'tensioning', and can safely park the vehicle with the electromechanic parking brake. The operation by the driver is given highest priority also in this case.

When the electric parking brake device is tensioned by a driver assistance system (such as a hill holder) according to another example, with the vehicle at standstill and the service brake system actuated, the driver is able to deactivate the hill holder for this case by actuating the operating element for the parking brake device in the direction 'release', with the service brake system continuously actuated. In case the driver nonetheless desires the starting-traction control when the service brake system is continuously actuated, he/she can actuate the electromechanic parking brake again by new actuation of the operating element in the direction 'tensioning', and the driver assistance system is re-activated. Thus, the operation of the vehicle by the driver always has a higher priority than the requirements of the comfort-oriented and automatic APB module 6. With different signs of the actuating force variations, i.e., sign ($\dot{F}_{EPB}$)≠ sign ($\dot{F}_{APB}$), an algorithm with a second calculating instruction 9

$$\dot{F}_{res} = \dot{F}_{EPB}$$

$$F_{res} = F_{EPB}$$

will be used to determine the resulting output signals $F_{res}$ and $\dot{F}_{res}$ for the actuation of the actuator device.

In the absence of an actuation of the operating element for the parking brake device by the driver, the actuating condition within the EPB module, i.e., $\dot{F}_{EPB}=0$, will not change according to a third case of application. For this case, the coordination module gives the signals of the APB module higher priority during the actuation of the actuator device which is due to the lack in direct influence of the driver on the condition of the parking brake device. Thus, the resulting actuating signals $F_{res}$ and $\dot{F}_{res}$ correspond to the output signals $F_{APB}$ and $\dot{F}_{APB}$ of the APB module. For the case $\dot{F}_{EPB}=0$, an algorithm with a third calculating instruction 10:

$$\dot{F}_{res} = \dot{F}_{APB}$$

$$F_{res} = F_{APB}$$

is used to determine the output signals $F_{res}$ and $\dot{F}_{res}$ for the actuation of the actuator device within the coordination module 7.

A like configuration of the control device along with an associated method for the control of the brake systems permits a corresponding modular design of the control device 1 with its software component parts. This allows a defined layout of the individual software modules which must be implemented in the control device 1 only with respect to their interaction. Further, this renders possible to use EPB modules 5 that are already known and provided without modifications for vehicles with an extended functionality. Thus, additional driver assistance functions may be retrofitted in a simple way.

What is claimed is:

1. Method of controlling a brake system, including a electromechanic parking brake element for detecting the driver's request for brake actuation, an electronic driver assistance device for executing at least one brake-specific driver assistance function, a wheel brake actuator, and an electronic controller, comprising the steps of:

transmitting signals from both the electromechanic parking brake element and the electronic driver assistance device to the electronic controller, generating output signals from the electronic controller to the wheel brake actuator, signals representative of an actuating force and actuating force variation, which are preset values for the end value of a tensionary force to be exerted by the actuator device and for a force variation which is to be used by the wheel brake actuator until an end value actuating force is reached, wherein the electronic controller employs a first module for generating output for generating output signals representative of the actuating force and actuating force variation necessary for the execution of the parking brake function induced by the driver, a coordination module for comparing the actuating force variations generated by the first or second module and, in dependence on the sign of the actuating force variations and prioritizing the output signals of either of the first or the second module as output signals for the actuation of the actuator device.

2. Method of controlling a brake system as claimed in claim 1, wherein the electronic controller includes a the second module generates as signals the actuating force and the actuating force variation necessary for the execution of the automatic driver assistance function.

3. Method as claimed in claim 1, further including the step of:

using the coordination module to give higher priority to the signals of the first module whenever the signs differ of the actuating force variation output signals generated by the first and second modules.

4. Method as claimed in claim 3, further including the step of:

using the output signal of the first module as the output signal of the electronic controller.

5. Method as claimed in claim 1, further including the step of:

using the coordination module to give higher priority to the signals of the module with greater dynamics with respect to the execution of the brake function whenever the signs are the same between actuation force variation output signals generated by the first and second modules.

6. Method as claimed in claim 5, further including the step of:

selecting the greater of the actuating force output signals generated by the first and second modules.

* * * * *